July 20, 1937.    O. W. RANDOLPH    2,087,781
PLANT FOOD MANUFACTURE
Filed Aug. 1, 1931    3 Sheets-Sheet 3
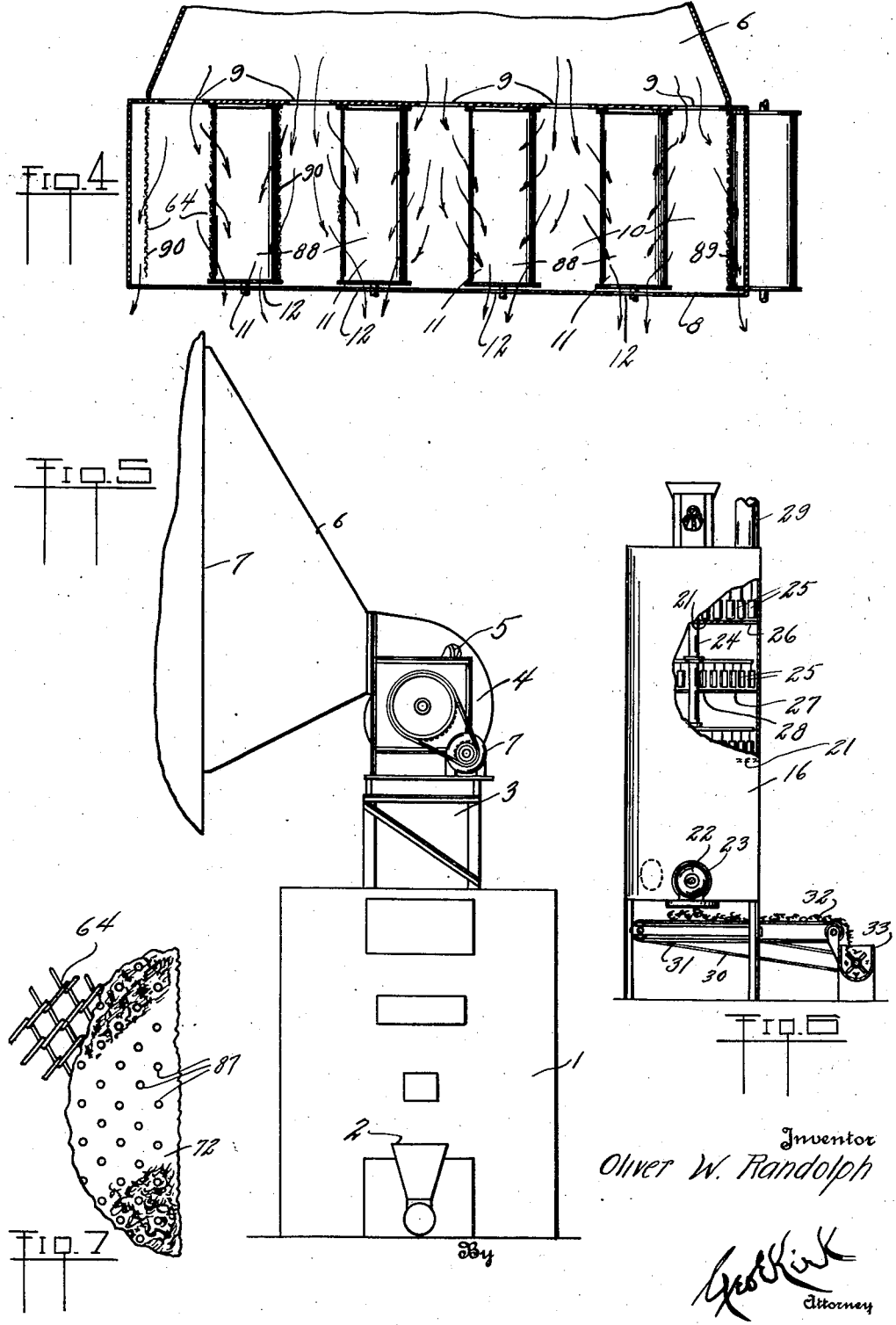
Inventor
Oliver W. Randolph
By
Geo Kirk
Attorney Patented July 20, 1937

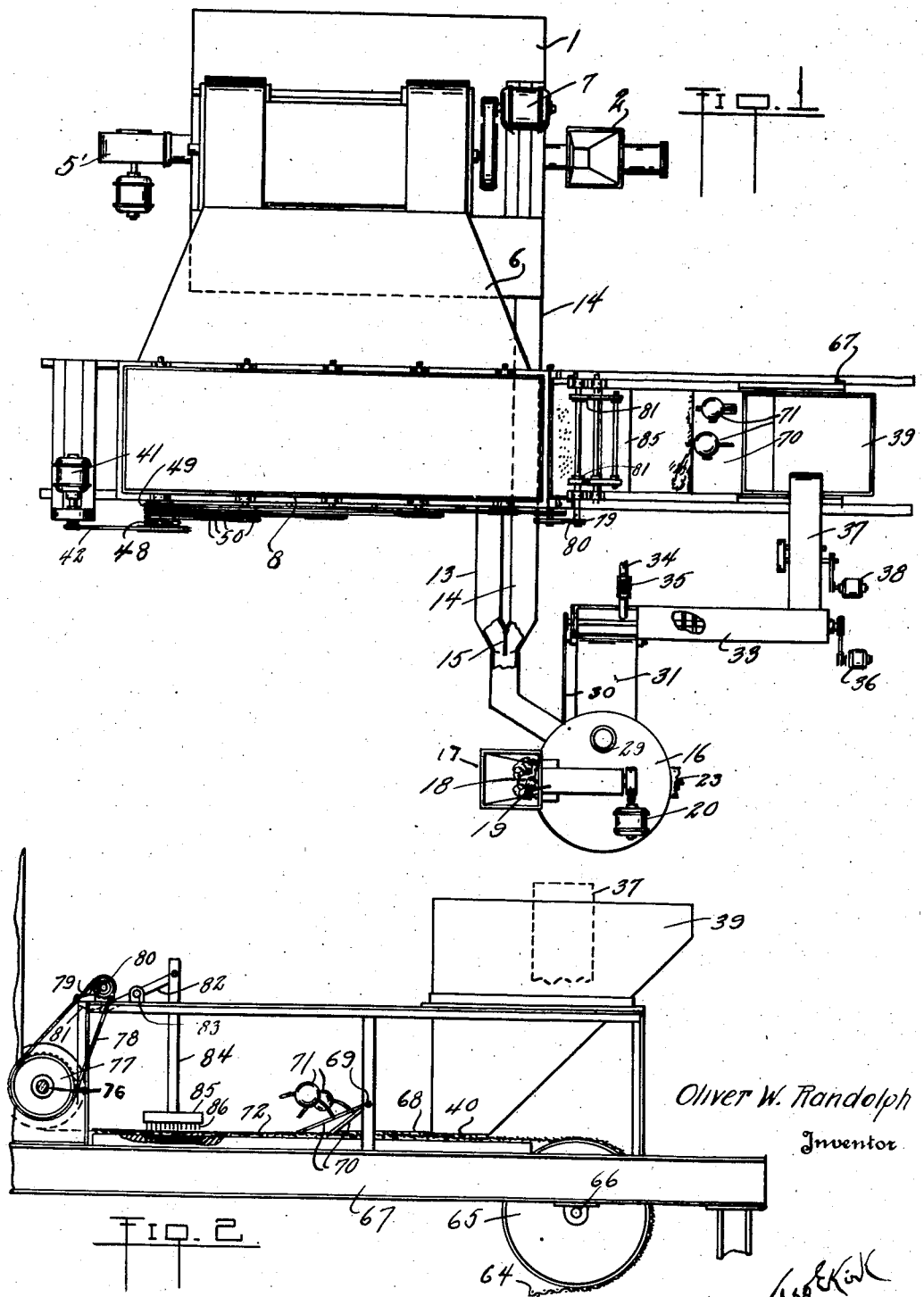

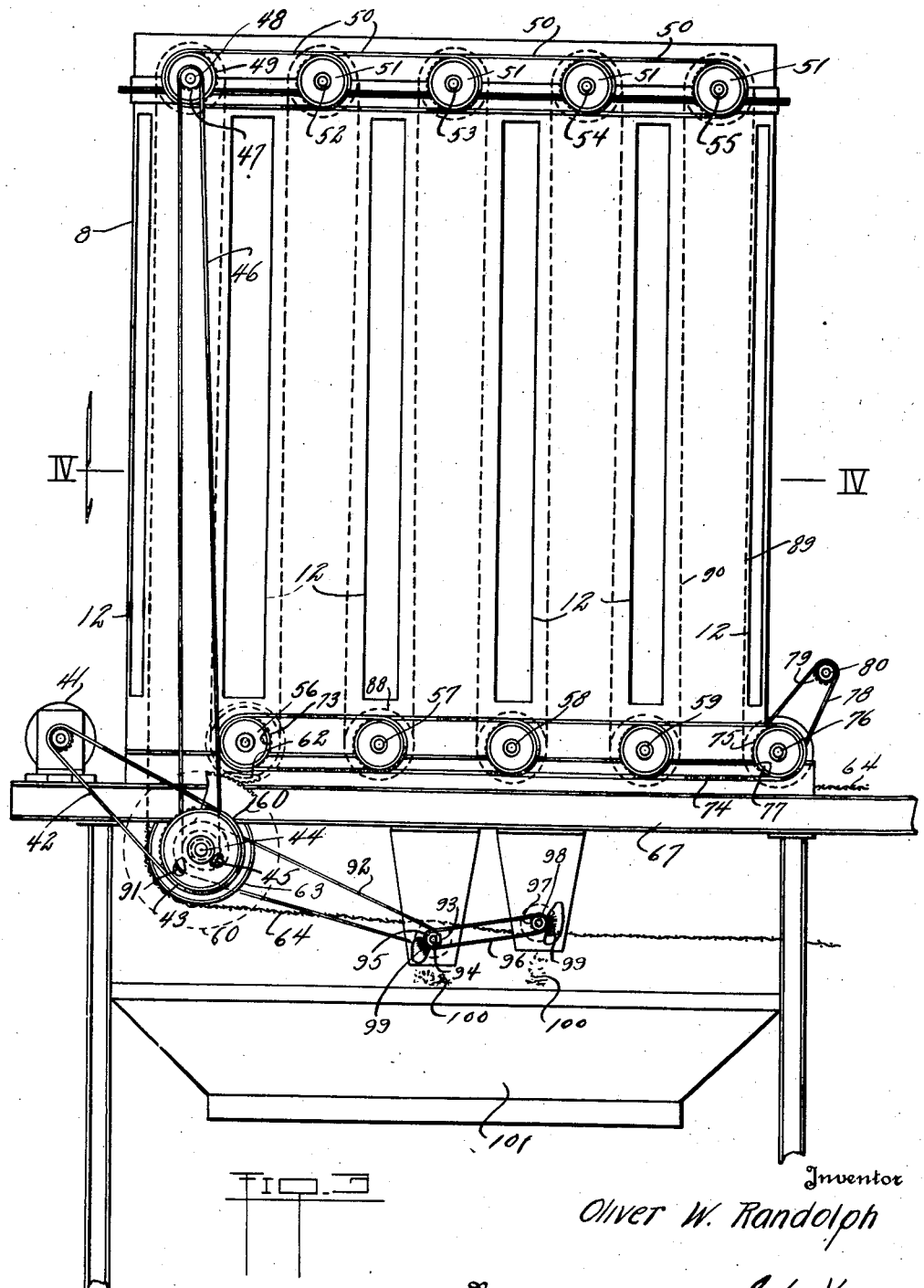

2,087,781

UNITED STATES PATENT OFFICE 2,087,781

PLANT FOOD MANUFACTURE

Oliver W. Randolph, Toledo, Ohio

Application August 1, 1931, Serial No. 554,415

9 Claims. (Cl. 34—12)

This invention relates to treating material, more especially for the removal of moisture therefrom.

This invention has utility when incorporated in handling sewage sludge, more particularly for the production of fertilizers for the turf or greens of golf courses.

Referring to the drawings:

Fig. 1 is a plan view of an embodiment of the invention for effecting drying of sewage sludge into agricultural fertilizer materials;

Fig. 2 is a fragmentary side elevation, on an enlarged scale of feeder and perforator features of the installation of Fig. 1;

Fig. 3 is a fragmentary side elevation of the drier portion of the installation of Fig. 1;

Fig. 4 is a section on the line IV—IV, Fig. 3;

Fig. 5 is a fragmentary elevation, from the right of Fig. 1, showing features of the drying medium supply;

Fig. 6 is a fragmentary elevation of the peat drier and its assembly connections in the installation; and Fig. 7 is a detail view in plan of a layer fragment of the material and its support for passage thru the drier proper.

Furnace 1 may be of the hot air type, along the lines of the disclosure in U. S. Patent 1,685,339, to O. W. Randolph, Sept. 25, 1928. Fuel may be supplied by stoker 2. The drying medium, which may include warmed air as well as the gases from the products of combustion, may pass by duct 3 to be drawn into chamber 4, and there forced by fan 5 into spread delivery way 6. The fan 5 is driven by motor 7. Draft into the furnace 1 is promoted by fan 5' (Fig. 1).

The way 6 extends to housing 8 having entrance ports (Fig. 4) or openings 9 to chambers 10 in communication with chambers 11 from which exit ports or openings 12 may discharge the gaseous medium as more or less chilled and with an acquired volatile or moisture portion. These gases may be allowed to escape, or be conserved by effecting stage reuse, if not in the housing 8, by conducting such, or a portion thereof through duct 13.

Duct 13 is in communication with duct 14 from the furnace 1 as a branch or separate from the delivery to the way 6 (Fig. 1). Damper 15 may be adjusted for mixing of gases or selection of either for delivery to peat drier housing 16. Hopper 17 is in communication with a supply of peat, more or less coarse, which as air dried, may carry quite a moisture content. This peat 18 is drawn into grinder 19 driven by motor 20. The subdivided peat is thus delivered into the upper portion of the housing 16 to fall upon deck 21. Motor 22 is connected by speed reduction gearing 23 for slowly rotating shaft 24, having thereon at different deck regions, a plurality of radial series of plows 25. These plows are (Fig. 6) so disposed as to progress material from the deck 21 to fall thru opening 26 near the outer portion of the deck to be received by next lower deck 27, there urged by the plows toward the shaft 24 to fall thru opening 28 for a repetition of the cycle at a succeeding deck 21. During this travel of the ground peat, the drying medium passing the damper 15 flows upward across the several decks to remove moisture from the peat, and then passes from this drier by way of stack 29. Belt gearing 30 operates conveyor 31 (Fig. 6) for removing the dried peat from the drier and conducting this peat 32 to mixing conveyor 33.

Sewage disposal plants, especially for municipalities, are making efforts to separate the solid carrying portions of the sewage, which are rich in materials suitable for agricultural fertilizer purposes.

This sewage substance or waste, currently termed sludge, is separated from the relatively clear water portions. The clear water portions are so handled that such may be returned, say to streams or bodies of water, with pollution dangers practically eliminated, or so reduced as to cause no serious hazard. The sludge is not responsive to water removal in an economical manner directly to give the sludge commercial worth competitively in dry agricultural fertilizer fields. Where the sludge may be hauled in tanks, and there is no objection to the odors therefrom, when dumped in the fields, it has fertilizer value. This greatly limits the use of these valuable soil enriching properties.

Such sludge is readily pumped about at the sewage disposal plant, and supply line 34 has valve 35 adjustable to regulate the flow of such sludge into the mixing conveyor 33. This mingling with ground dried peat is in such proportion of the peat as to produce a paste, which may be of the consistency of a thin putty. The peat need not be added to a proportion to give the sludge a heavy thick body. However, as a minimum, it should be added so to hold the mass that it may be spread into a layer, at least without materially running therefrom. Motor 36 drives this mixing conveyor, which delivers to conveyor 37 serving as an elevator driven by motor 38 to discharge the paste material into hopper 39.

This hopper 39 has lower discharge port 40. The gearing 30 is driven from the motor 36.

Motor 41 is effective thru sprocket chain 42 to drive wheel 43 on shaft 44 located below the housing 8. Sprocket wheel 45 on the shaft 44 is connected by sprocket chain 46 with sprocket wheel 47 on shaft 48 above the housing 8 (Fig. 3). Sprocket wheels 49 on the shaft 48 have sprocket chains 50 extending to sprocket wheels 51 on shafts 52, 53, 54, 55, located above the ports 9. Shafts 56, 57, 58, 59, are located below the ports 12. The shaft 44 carries gear wheel 60 in mesh with gear wheel 62 on the shaft 56.

The shaft 44 has thereon drum 63 for mesh wire belt 64 (Fig. 3) extending to drum 65 on shaft 66 mounted by the frame 67 (Fig. 2) to have a reach of this flexible linkage belt 64 pass below the discharge port 40 of the hopper 39, there to receive flow of paste 68, herein disclosed as sewage sludge thickened with ground dried peat, which peat has constituents not objectionable, and in some instances desirable for a soil fertilizer.

It is desirable to have the paste maintain its position with the belt 64 so that the belt travel directions may be changed and the region for treatment be localized. Pivot bearings 69 for leaves or plates 70 having adjustable weights 71, provide spreader means for compacting the sludge-peat mass 68 into a layer 72. This belt-held mass 68 has more or less continuity. To increase its susceptibility to drying action, it has been found advantages follow from use of the treating medium for effecting such drying, thru the mass. Treatment to render the mass porous or perforate is undertaken. In carrying this out mechanically, sprocket wheel 73 on the shaft 56 has sprocket chain 74 to sprocket wheel 75 on shaft 76. Sprocket wheel 77 also on the shaft 76 has chain 78 therefrom to sprocket wheel 79 on shaft 80 (Fig. 3). This shaft 80 has thereon cam 81 (Fig. 2) acting on lever 82 having fulcrum 83. Remote from the cam 81, the lever 82 is connected to bar 84 having plate 85 from which depend a plurality of relatively loose pins 86. Rotation of the shaft 80 during the travel of the belt 64, causes the plate 85 to bob up and down and the pins 86 to be thrust thru the mesh openings in the belt 64 to make perforations 87 thru the layers 72.

The layer is now ready for treatment by the drying medium, and is conducted into the housing 8 as supported by the belt 64. Its travel is about drums 88 on shafts 76, 55, 59, 54, 58, 53, 57, 52, 56, 48 to the drum 63. The drums may have coverings of the rubber belting type.

It is thus seen that upwardly traveling reaches 89 and downwardly traveling reaches 90 in the housing 8 provide side walls for the chambers 10 into which the hot air enters by way of the ports 9. The perforations 87 in the layer 72 of the sludge-peat paste mass serve as ports for the flow of the medium from the chambers 10 into the chambers 11 in the housing 8 between downwardly traveling reaches 90 and upwardly traveling reaches 89. From these chambers 11 the medium having taken on volatiles from the layer 72 toward drying out such mass, may have exit at the ports 12. In practice these reaches 89, 90, may be fifteen to twenty feet long. The spiral wire mesh belt 64 may be four feet wide. The number of reaches, and consequently the length of the belt, may vary with the capacity desired and the lineal travel rate adopted for the belt.

Atmospheric conditions may be a minor factor affecting operation, more particularly as to the air humidity. The extensive use of peat as bedding material, for livestock, provides a source in such stable waste suitable as a raw material to be handled hereunder with advantages in economies from low cost therefor. Stable waste or manure alone may suffice for treatment of this invention and need not involve body addition as herein disclosed and identified as peat.

The dried product from the housing 8 is largely still retained by the belt 64. Sprocket wheel 91 on the shaft 44 has sprocket chain 92 extending to sprocket wheel 93 (Fig. 3) on shaft 94. Sprocket wheel 95 on the shaft 94 has sprocket chain 96 therefrom to sprocket wheel 97 on shaft 98. On the shaft 94 is rotary brush 99 for the lower side of the belt 64, while on the shaft 98 is rotary brush 99 for the upper side of the belt 64. There is thus effected positive removal of the dried substance 100 as a subdivided mass into collecting chamber or hopper 101 in a condition suitable for sacking, or other packaging for indefinite postponement of later use. Even from sewage waste, this product does not carry objectionable odors, and so may be used, even in the playing season, as a turf food on golf courses and on the lawns of private estates. The deodorizing is promoted by the combustion fumes from the furnace which may include some sulfur.

What is claimed and it is desired to secure by Letters Patent is:

1. The method of reducing the moisture content of paste material comprising forming the material into a sheet-like layer, perforating said layer by means reciprocating transversely of the layer while retaining the layer in its sheet-like form and circulating a drying medium about the layer and through the perforations.

2. The method of producing plant food in dry form comprising mixing ground peat with sewage sludge to form paste material, forming the material into a horizontally extending sheet-like layer, vertically perforating the layer while the layer is retained in its sheet-like form, and subjecting one side of the layer to incoming forced draft to pass through such layer.

3. A sewage sludge handling installation embodying foraminous conveyor means, a feeder device thereto to form supply material into a sheet-like layer on the conveyor means, perforating means for the layer, an actuator for reciprocating the perforating means directly through the layer while the layer is adherent to the conveyor means, and means for flowing a drying medium through the perforations of the layer after the perforating means are withdrawn to effect draft through the perforations in the layer and the openings of the conveyor means registering therewith.

4. An agricultural fertilizer installation embodying a foraminous conveyor for a paste material, means for spreading the material on the conveyor into layer form, means for creating openings through the spread material in registry with the openings in the conveyor, said layer being adherent to the conveyor, and gas supply and conducting means for flowing gas through the openings in the material registering with openings through the conveyor.

5. The method of reducing the moisture content of coherent material comprising forming the material into a sheet-like layer, perforating said layer while retaining the layer in a continuous sheet-like form and circulating a drying medium about the layer and through the perforations.

6. The method of reducing the moisture content of paste material comprising forming the material into a sheet-like layer, perforating the layer while retaining the layer in its sheet-like form, placing the layer to act as a perforate diaphragm, and circulating a drying medium through the perforations of said diaphragm.

7. The method of drying comprising forming paste material into a horizontally extending sheet-like layer, vertically perforating the layer while the layer is retained in its sheet-like form, progressing said layer as a perforate diaphragm, subjecting one side of the perforate diaphragm to incoming forced draft, and conducting exhaust from the other side of the diaphragm in promoting drying draft through the perforate diaphragm.

8. A sewage sludge handling installation embodying conveyor means having openings therethrough, a feeder device thereto to form supply material into a sheet-like layer on the conveyor means, perforating means for the layer adjacent the device, an actuator for operating the perforating means to pierce directly into the layer and through said openings in the conveyor means, and housing means for the conveyor means spaced from the device for flowing a drying medium through the perforations of the layer as maintained by the conveyor means in sheet-like form after the perforating means are withdrawn, thereby to effect draft through the conveyor means openings and the perforations of the layer.

9. A drier installation embodying a conveyor for paste material, said conveyor having openings therethrough, means for spreading the material on the conveyor into layer form, means for creating openings through the spread material and at the openings in the conveyor, said layer being carried therefrom by the conveyor in maintained sheet-like form, and gas supply and conducting means for flowing gas through the openings in the conveyor and material.

OLIVER W. RANDOLPH.